No. 871,437. PATENTED NOV. 19, 1907.
W. S. POINDEXTER.
AUTOMATIC GATE.
APPLICATION FILED MAR. 6, 1907.
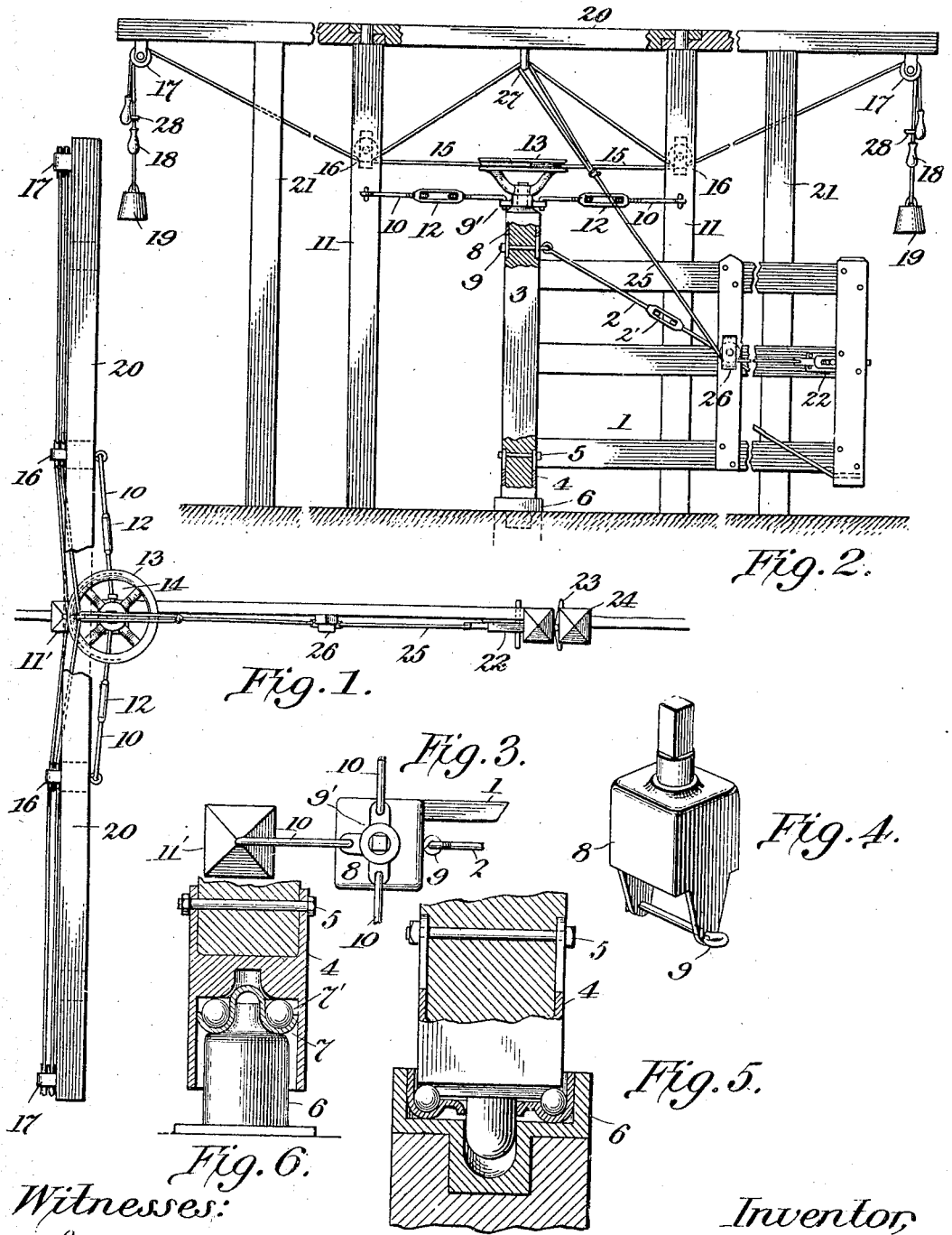
Witnesses:
Inventor,

UNITED STATES PATENT OFFICE.

WILLIAM SAMUEL POINDEXTER, OF LOUISA, VIRGINIA.

AUTOMATIC GATE.

No. 871,437.  Specification of Letters Patent.  Patented Nov. 19, 1907.

Application filed March 6, 1907. Serial No. 360,904.

*To all whom it may concern:*

Be it known that I, WILLIAM SAMUEL POINDEXTER, a citizen of the United States, residing at Louisa, in the county of Louisa and State of Virginia, have invented new and useful Improvements in Automatic Gates, of which the following is the specification.

My invention relates to improvements in automatic gates pivoted at the end and which can be opened and closed without necessitating the traveler to alight from his conveyance or it may be opened by the pedestrian the same as a common latch gate. I attain these objects by the use of the mechanism illustrated in the accompanying drawing in which—

Figure 1, is a top view of the gate closed; Fig. 2, a perspective view of the gate opened; Fig. 3, is a top view of the main upright of the gate, after the removal of the wheel, showing the collar and the attachments of the brace rod; Fig. 4, is a detailed perspective view of the upper pivot; Figs. 5 & 6, are sectional views of the different forms of the lower pivot.

Similar numerals refer to similar parts throughout the several views.

Referring to the accompanying drawings 1 refers to the gate having a single brace-rod 2 having a turnbuckle 2', which by turning will lengthen or shorten the rod thereby raising or lowering the outer end of the gate causing it always to move on the same or any desired plane. The gate has a main upright 3 the end of which is reduced and fits into a socket 4 having the bolt 5 passing through each thereby keeping the socket firmly attached to the upright.

6 is a short post, resting upon and fastened to a horizontal beam embedded in the earth at right angles to the gate when closed, on the top of said post rests the cup 7 holding balls 7' which support and are surrounded by socket 4 as represented by Fig. 6 or it may have the lower socket and pivot arranged as in Fig. 5. The upper end of the upright 3 is reduced to enter the socket of the cap 8 and held secure by bolt 9 which has an eye to which is fastened the upper end of the brace rod 2; the cap 8 is cylindrical above its attachment Fig. 4 to revolve in the collar 9' which has eyes for the attachment of brace rods 10 Fig. 3 which by their attachment to post 11 hold the upright 3 vertical; rods 10 contain turnbuckles 12 by the manipulation of which the gate may be caused to swing in the desired plane; posts 11, are set at the rear of the gate on opposite sides of post 11', which holds the principal weight of the gate when closed but posts 11 hold the principal weight when the gate is open. The top of cap 8 is squared as seen in Fig. 4 to fit into the wheel 13 which is attached thereto by set screw 14; 15 is a copper wire fastened to the wheel and passing around the rear and to the opposite side of the same extends through guide pulley 16 to guide pulley 17 thence to handle 18 and to weight 19; guide pulley 17 is attached to top-rail 20 which extends over post 11 and 21 and not only acts as a base of attachment to guide pulleys 17 but also braces posts 11; 22 is a spring latch which engages latch-keeper 23 on latch-post 24, 25 is a copper wire passing from the end of latch 22 through guide pulley 26 to guide pulley 27 and through guide pulley 17 to handle 28, which carries an eye through which passes the wire to handle 18.

If the gate is closed as in Fig. 1, to open it it is necessary for the traveler to grasp handle 28 drawing it down to handle 18, by which the latch is released, by continuing the pull, handle 18 will be depressed and the gate started to rotating, when handle 18 may be grasped and the downward movement continued until the gate has swung around and the latch has engaged a keeper like 23 on post 21 which is set the same distance from main upright 3 as latch post 24. To close the gate the traveler passes through and repeats as above at the other end until the latch engages latch-keeper 23 on post 24.

I claim:

1. The combination with four auxiliary posts united by a top rail the inner posts provided with pulleys secured to the same near their upper ends; of a gate provided with a diagonal brace rod, and a turnbuckle for raising and lowering the gate, a spring latch secured to the forward end of the gate, a pulley secured to the inner batten of the gate, a cord passed under the pulley one of its ends secured to the inner end of the latch, and the other end passed through a staple secured to the top rail of the auxiliary posts, a base for the main gate upright having a large socket therein terminating in a smaller socket, a grooved plate seated in the larger socket, ball bearings seated in the grooves in the plate, a cap having perforations at its lower end through which is passed an eyebolt for securing it to the upright, and a collar carried by the cap having perforated short arms for receiving the free ends of brace rods secured to the adjacent auxiliary posts, the cap being revoluble within the collar.

2. The combination with four auxiliary posts united by a top rail, the inner posts provided with pulleys secured to the same near their upper ends, of a gate provided with a diagonal brace rod and turnbuckle for raising and lowering the gate, a spring latch secured to the forward end of the gate, a pulley secured to the inner batten of the gate, a cord passed under the pulley having one of its ends secured to the inner end of the latch, and the other end passed through a staple secured to the top rail of the auxiliary posts, a base for the main gate upright having a large socket therein terminating in a smaller socket, a grooved plate seated in the larger socket, ball bearings seated in the grooves in the plate, a cap having perforations at its lower end through which is passed an eyebolt for securing it to the said upright, a collar carried by the cap having perforated short arms for receiving the free ends of brace rods secured to the adjacent auxiliary post the cap being revoluble within the collar; and a peripherally grooved wheel located on an extension of the cap, a weighted operating wire secured to the wheel and passing over and under pulleys secured to the adjacent auxiliary posts and to the ends of the top rail thereof.

3. The combination with four auxiliary posts united by a top rail the inner posts provided with pulleys secured to the same near their upper ends, of a gate provided with a diagonal brace rod and turnbuckle for raising and lowering the gate, a spring latch secured to the forward end of the gate, a pulley secured to the inner batten thereof, a cord passed under the pulley having one of its ends secured to the inner end of the latch, and the other end passed through a staple secured to the top rail of the auxiliary posts, a plate a cap having perforations at its lower end through which is passed an eyebolt for securing it to the upright, a collar carried by the upper part of the cap having perforated short arms for receiving the free ends of brace rods secured to the adjacent outer auxiliary posts a peripherally grooved wheel located on an extension of the cap, weighted operating wires secured to the wheel and passing over and under pulleys secured to the adjacent auxiliary posts and ends of the top rail thereof; and a post supporting base, an inverted ∩-shaped plate having grooves therein, ball bearings seated within said grooves, and an upper and lower socketed post supporting receptacle.

WILLIAM SAMUEL POINDEXTER.

Witnesses:
P. B. PORTER,
W. R. GOODWIN.